T. A. COCHRANE,
Assignor, by mesne assignments, to J. HENDY.
Feeder for Quartz Mills.
No. 9,048. Reissued Jan. 20, 1880.
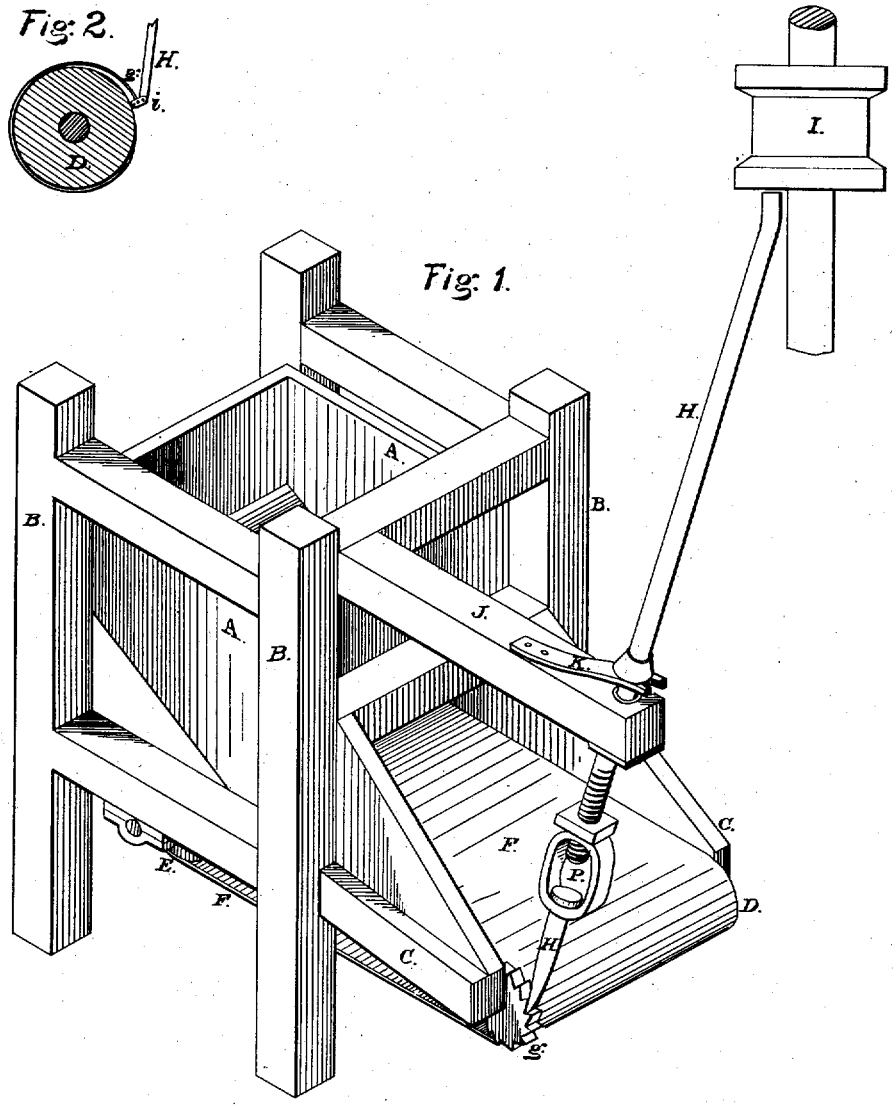
Witnesses:
John L. Boone
Wm. F. Clark
Inventor:
Thomas A. Cochrane
Per Boone & Osborn
Attorneys.

UNITED STATES PATENT OFFICE.

THOMAS A. COCHRANE, OF SAN FRANCISCO, CALIFORNIA, ASSIGNOR, BY MESNE ASSIGNMENTS, TO JOSHUA HENDY.

FEEDER FOR QUARTZ-MILLS.

SPECIFICATION forming part of Reissued Letters Patent No. 9,048, dated January 20, 1880.

Original No. 139,370, dated May 27, 1873. Application for Reissue filed November 18, 1879.

*To all whom it may concern:*

Be it known that I, THOMAS A. COCHRANE, of San Francisco, county of San Francisco, State of California, have invented an Improved Feeder for Quartz-Mills; and I do hereby declare the following description and accompanying drawings are sufficient to enable any person skilled in the art or science to which it most nearly appertains to make and use my said invention or improvement without further invention or experiment.

My invention relates to an improved device for feeding quartz and other substances to machinery for crushing and grinding the same; and it consists of an adjustable spring-rod disposed under the tappet and actuating the ore-delivering apron, and of a spring-rod acted upon by the tappet and actuating the ore-delivering-apron-operating mechanism, substantially as hereinafter more fully set forth.

In order to explain my invention so that others will be able to construct and operate the same, reference is had to the accompanying drawings, forming a part of this specification, in which Figure 1 is a perspective view of my device.

A represents a hopper, which is supported in a frame, B. This frame should be situated close up to the machinery into which it is intended to feed the ore or other substance for the purpose of crushing or grinding it, and the lower side timbers, C C, extend out from the frame on one side to the proper distance to support a drum or roller, D, above where it is desired to drop the ore. Another roller or drum, E, is supported inside of the frame B, parallel with the roller D, and a broad endless band or apron, F, passes around these two rollers, so that its upper surface will travel just below the lower or feed opening of the hopper A.

A ratchet-wheel, *g*, is secured to one end of the roller D, and is operated by a spring-bar, H, from the tappet I on the stamp-stem, or from some other part of the machinery, to cause the roller to revolve, and thus move the endless band.

The spring-bar H is supported in the end of a projecting timber, J, and a spring, K, serves to lift it after each drop of the stamp. A turn-buckle, P, is inserted in the length of this rod, so as to permit of the lengthening or shortening of the rod, for regulating the amount of feed. The upper end of this bar rests beneath the tappet I, as shown, and consequently it will be supported in an inclined position, in order that its lower end may engage with the ratchet *g*.

It is evident that instead of the ratchet-wheel *g* the friction-clutch or clamping-band *g'*, (shown in Fig. 2,) may be used. As the rod H passes up the short lever lets the band move back, and as the rod comes down the band is cramped and turns the drum D.

The operation of the machine will then be as follows: The ore to be crushed or ground is placed in the hopper A, and passes through the lower opening of the hopper, which is regulated in size according to the quantity of ore it is desired to feed. After passing through the lower opening of the hopper the ore is received upon the horizontal endless band F. As the stamp descends the tappet operates the bar H and causes the roller D to revolve, consequently feeding the ore forward by moving the belt or band, thus automatically supplying the stamps with ore in the proper quantity.

The drop of the stamp determines the quantity of ore to be fed, as when a sufficient quantity of ore is beneath the stamp it will not drop so far, and consequently will not operate the feeding device; but when the quantity of ore beneath the stamp diminishes the drop is greater and the feeding increased. A crank-wheel could be used for the rod to operate upon, if desired.

This arrangement is quite simple, and possesses the advantage of being able to feed very wet ore without trouble.

I am aware that the rod H has heretofore been used, and consequently do not claim it broadly; but,

Having thus described my invention, what I claim, and desire to secure by Letters Patent, is—

1. The spring-rod H and tappet I, in combination with the hopper A and endless apron or belt F and its driving mechanism, substantially as and for the purpose set forth.

2. The spring-rod H, having an adjustable connection, P, in combination with the hopper A, endless apron F, and its operating mechanism, substantially as and for the purpose specified.

3. The combination, with the hopper A and endless apron F, with the operating-ratchet *g*, of the spring-rod H, having an adjustable connection, P, and tappet I, substantially as and for the purpose set forth.

In witness whereof I have hereunto set my hand and seal.

THOMAS A. COCHRANE. [L. S.]

Witnesses:

W. J. PETTIGREW,

P. A. BROWN.